(12) United States Patent
Kim et al.

(10) Patent No.: US 11,393,631 B2
(45) Date of Patent: Jul. 19, 2022

(54) ELECTRONIC COMPONENT

(71) Applicant: SAMSUNG ELECTRO-MECHANICS CO., LTD., Suwon-si (KR)

(72) Inventors: Je Jung Kim, Suwon-si (KR); Su Kyoung Cha, Suwon-si (KR); Ji Won Lee, Suwon-si (KR); Seung Ryeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 16/852,811

(22) Filed: Apr. 20, 2020

(65) Prior Publication Data
US 2021/0183579 A1 Jun. 17, 2021

(30) Foreign Application Priority Data
Dec. 13, 2019 (KR) ........................ 10-2019-0167026

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/012* (2013.01); *H01G 4/1218* (2013.01)

(58) Field of Classification Search
CPC .......... H01G 4/224; H01G 4/248; H01G 4/30; H01G 4/38; H01G 4/012; H01G 4/1227;
(Continued)

(56) References Cited

U.S. PATENT DOCUMENTS

| | | | |
|---|---|---|---|
| 7,331,799 B1* | 2/2008 | Lee .................. | H05K 3/301 |
| | | | 439/68 |
| 2010/0188798 A1* | 7/2010 | Togashi ............. | H01G 4/232 |
| | | | 361/306.3 |

(Continued)

FOREIGN PATENT DOCUMENTS

| | | |
|---|---|---|
| JP | H11251176 A | 9/1999 |
| JP | 6036979 B2 | 11/2016 |

*Primary Examiner* — Michael P McFadden
(74) *Attorney, Agent, or Firm* — Morgan, Lewis & Bockius LLP

(57) ABSTRACT

An electronic component includes a capacitor body having first to sixth surfaces, the capacitor body including a plurality of dielectric layers stacked in a first direction connecting the fifth and sixth surfaces and first and second internal electrodes alternately disposed with the dielectric layer interposed therebetween; first and second external electrodes disposed on the first surface of the capacitor body, to be spaced apart from each other in a second direction connecting the third and fourth surfaces; and first and second metal frames connected to the first and second external electrodes, respectively. The first internal electrode includes a first lead portion exposed through the first surface of the capacitor body and connected to the first external electrode. The second internal electrode includes a second lead portion exposed through the first surface of the capacitor body and connected to the second external electrode.

20 Claims, 9 Drawing Sheets

(51) Int. Cl.
*H01G 4/12* (2006.01)
*H01G 4/012* (2006.01)

(58) Field of Classification Search
CPC .... H01G 4/1245; H01G 4/065; H01G 4/0085; H01G 4/40; H01G 4/12; H01G 4/1218; H05K 1/0231
See application file for complete search history.

(56) References Cited

U.S. PATENT DOCUMENTS

| | | |
|---|---|---|
| 2014/0153155 A1 | 6/2014 | Fujii |
| 2014/0240081 A1* | 8/2014 | Murowaki ........... H01H 85/201 337/208 |
| 2016/0088725 A1* | 3/2016 | Park ....................... H01G 2/065 174/260 |
| 2016/0126015 A1* | 5/2016 | Park ....................... H01G 4/012 174/260 |

* cited by examiner

ELECTRONIC COMPONENT

CROSS-REFERENCE TO RELATED APPLICATION(S)

The present application claims the benefit of priority to Korean Patent Application No. 10-2019-0167026 filed on Dec. 13, 2019 in the Korean Intellectual Property Office, the entire disclosure of which is incorporated herein by reference.

BACKGROUND

1. Field

The present disclosure relates to an electronic component.

2. Description of Related Art

Multilayer Ceramic Capacitors (MLCCs) are compact, high capacity and easy to mount.

Recently, due to the rapid rise of eco-friendly vehicles and electric vehicles, power driving systems in automobiles have been increasing, and the demand for multilayer capacitors required for automobiles has been increasing.

To use electronic components as automotive components, high levels of thermal reliability and electrical reliability are required therein, and thus, the performance requirements of multilayer capacitors are gradually increasing.

In detail, as component mounting density increases, a product capable of increasing mounting density in a limited space, implementing high capacity, and being resistant to vibrations and deformation is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an electronic component with high reliability and low ESR.

According to an aspect of the present disclosure, an electronic component includes a capacitor body having first and second surfaces opposing each other, third and fourth surfaces connected to the first and second surfaces and opposing each other, and fifth and sixth surfaces connected to the first, second, third and fourth surfaces and opposing each other in a first direction, the capacitor body including a plurality of dielectric layers stacked in the first direction and first and second internal electrodes alternately stacked with a respective dielectric layer interposed therebetween, first and second external electrodes disposed on the first surface of the capacitor body and spaced apart from each other in a second direction connecting the third and fourth surfaces, and first and second metal frames connected to the first and second external electrodes, respectively. The first internal electrode includes a first lead portion exposed through the first surface of the capacitor body and connected to the first external electrode. The second internal electrode includes a second lead portion exposed through the first surface of the capacitor body and connected to the second external electrode.

The first metal frame may include a first bonding portion coupled to the first external electrode, a pair of first vertical portions extending in a third direction connecting the first and second surfaces of the capacitor body, from both ends of the first bonding portion in the first direction, respectively, and a pair of first mounting portions extending from one ends of the pair of first vertical portions, respectively, to face each other in the first direction, and the second metal frame may include a second bonding portion coupled to the second external electrode, a pair of second vertical portions extending, in the third direction, from both ends of the second bonding portion in the first direction, respectively, and a pair of second mounting portions extending from one ends of the pair of second vertical portions, respectively, to face each other in the first direction.

The first metal frame may include a first connecting portion connecting the pair of first vertical portions in the first direction, and the second metal frame may include a second connecting portion connecting the pair of second vertical portions in the first direction.

The first connecting portion may be located outwardly of the third surface of the capacitor body in the second direction, and the second connecting portion may be located outwardly of the fourth surface of the capacitor body in the second direction.

The first metal frame may have a hexahedral shape in which one surface of the first metal frame in the second direction is spaced apart from the pair of first mounting portions, and the second metal frame may have an hexahedral shape in which one surface of the second metal frame in the second direction is spaced apart from the pair of second mounting portions.

The first metal frame may include a first guide portion extending in the third direction from the first connecting portion along a portion of the third surface of the capacitor body, and the second metal frame may include a second guide portion extending in the third direction from the second connecting portion along a portion of the fourth surface of the capacitor body.

The first and second external electrodes may include first and second connection portions respectively disposed on first surface of the capacitor body, and a pair of first and second band portions extending in the third direction from the first and second connection portions along portions of the fifth and sixth surfaces of the capacitor body, respectively.

The first metal frame may include a pair of first extension portions extending from the pair of first vertical portions to be connected to the pair of first band portions, respectively, and the second metal frame may include a pair of second extension portions extending from the pair of second vertical portions to be connected to the pair of second band portions, respectively.

The electronic component may further include a first conductive bonding layer arranged between the first bonding portion and the first external electrode, and a second conductive bonding layer arranged between the second bonding portion and the second external electrode.

The first and second conductive bonding layers may include a solder having a relatively high melting point.

According to another aspect of the present disclosure, an electronic component includes a capacitor body having first and second surfaces opposing each other, third and fourth surfaces connected to the first and second surfaces and opposing each other, and fifth and sixth surfaces connected to the first, second, third and fourth surfaces and opposing each other in a first direction, the capacitor body including a plurality of dielectric layers stacked in the first direction and first and second internal electrodes alternately stacked with a respective dielectric layer interposed therebetween, first and second external electrodes disposed on the first surface of the capacitor body and respectively connected to the first and second internal electrodes exposed through the first surface of the capacitor body, the first and second external electrodes being spaced apart from each other in a second direction connecting the third and fourth surfaces, and first and second metal frames face contacting the first and second external electrodes, respectively, and extending in a third direction connecting the first and second surfaces of the capacitor body to be mounted on a mounting substrate.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
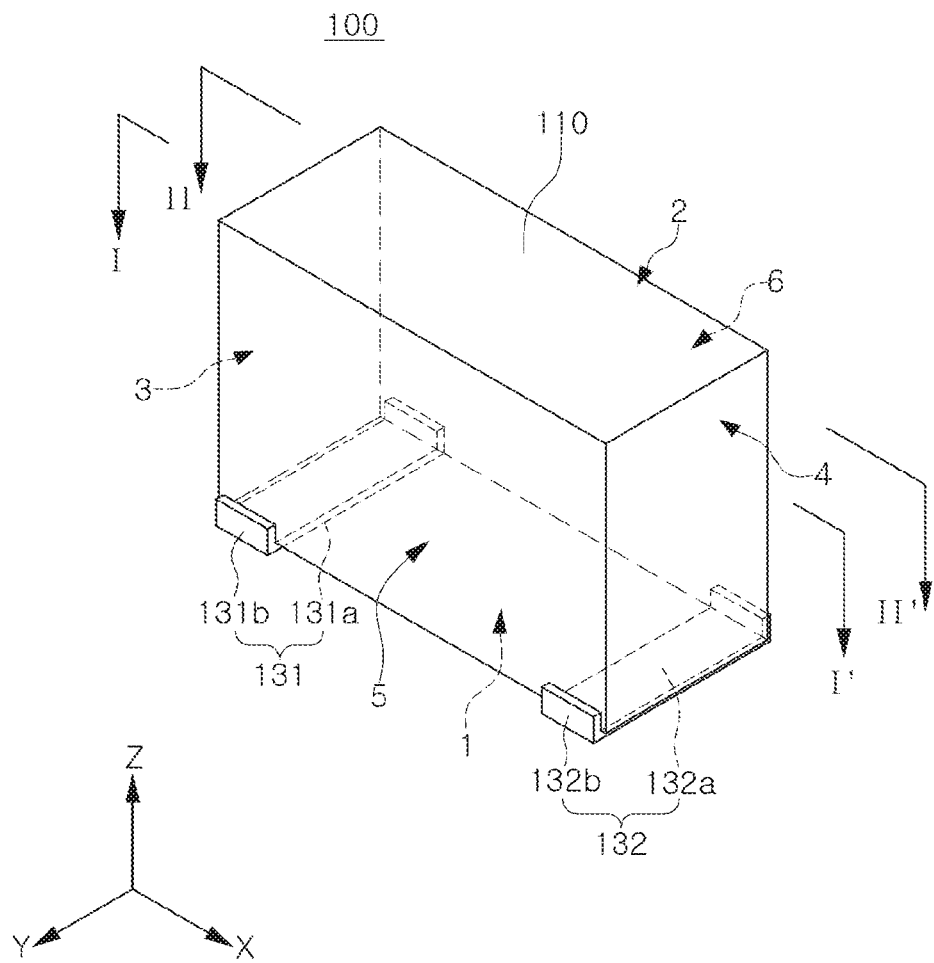
FIG. 1 is a perspective view schematically illustrating a multilayer capacitor applied to an electronic according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, exemplary embodiments of the present disclosure are described in further detail with reference to the accompanying drawings.

To clearly describe an exemplary embodiment of the present disclosure, the directions of the electronic components are defined, and X, Y, and Z illustrated in the drawings represent a length direction, a width direction, and a thickness direction, respectively.

In this case, the width direction may be used in the same concept as the stacking direction in which the dielectric layers are stacked.

Figure 2:
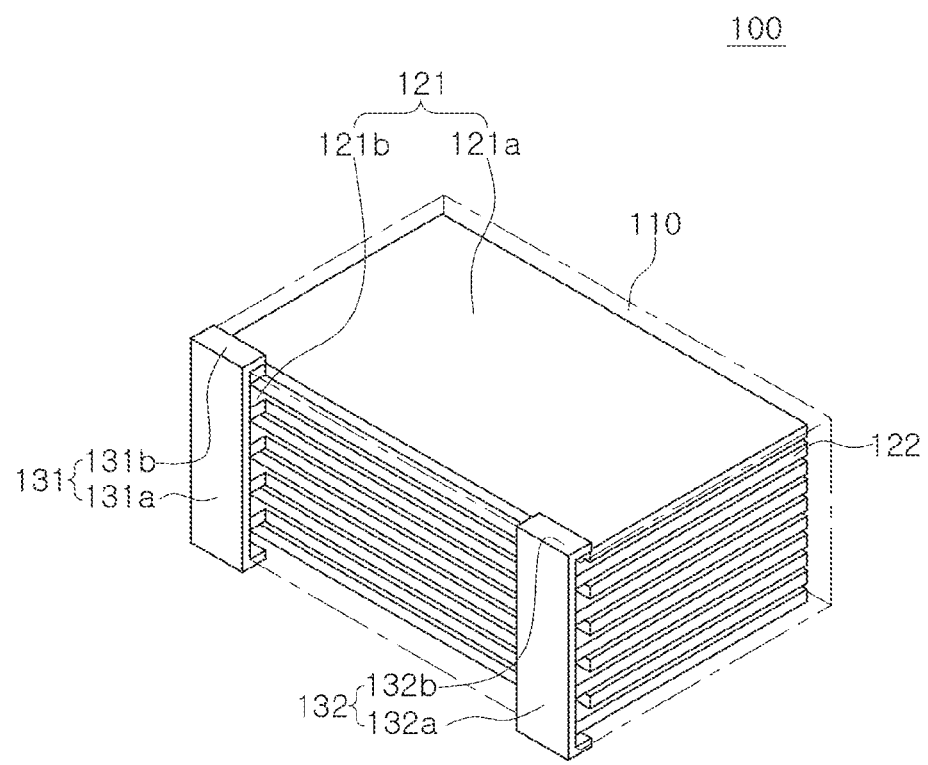
FIG. 2 is a transparent perspective view of FIG. 1.
Figure 3:
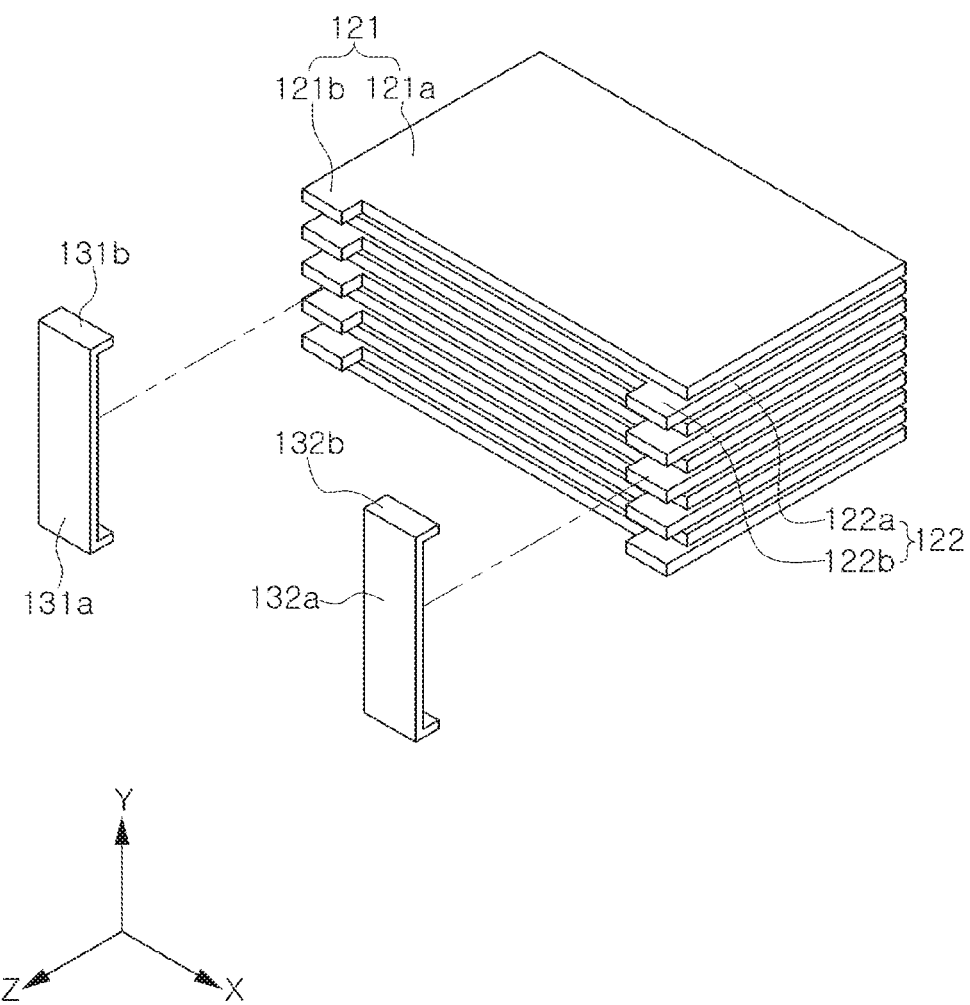
FIG. 3 is an exploded perspective view illustrating a coupling structure of first and second internal electrodes and first and second external electrodes in FIG. 2.
Figure 4:
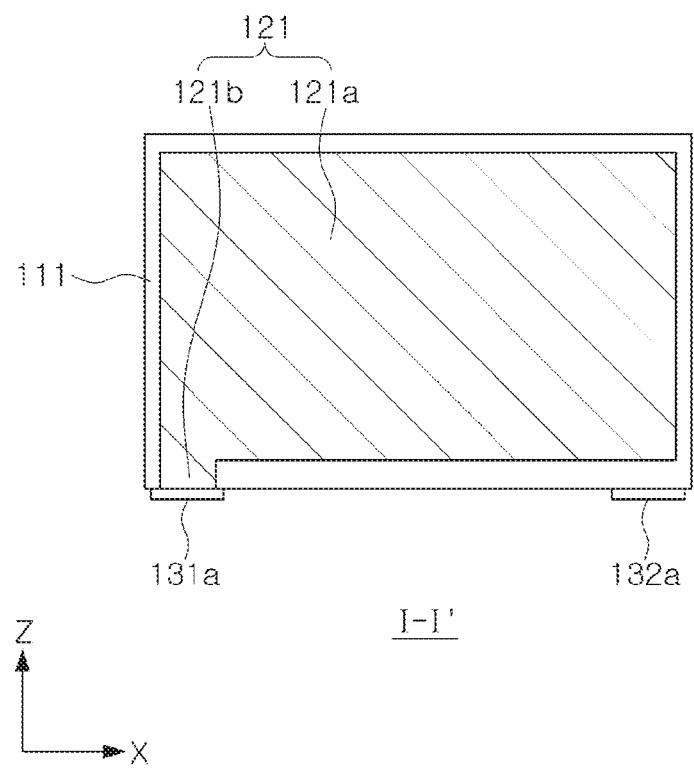
FIG. 4 is a cross-sectional view taken along line I-I' of FIG. 1.
Figure 5:
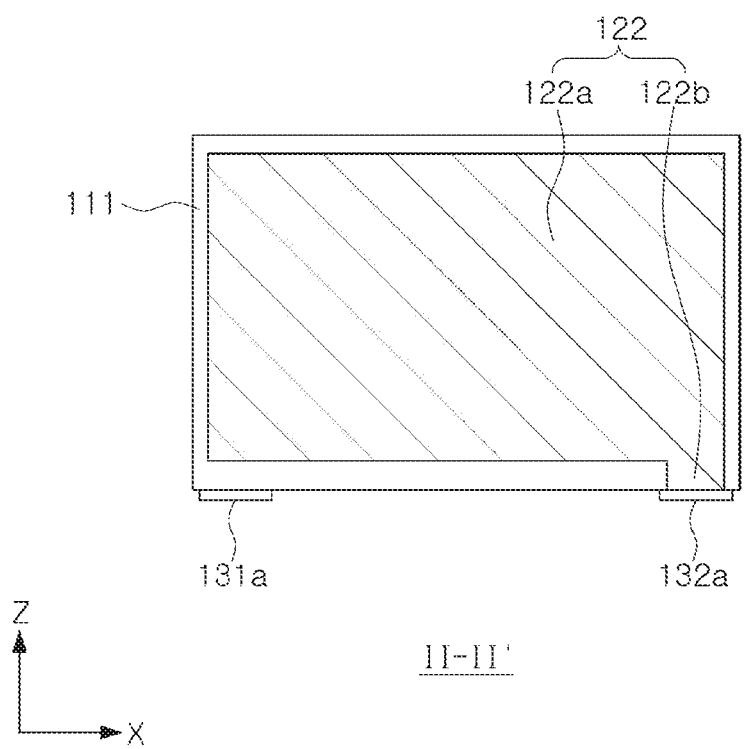
FIG. 5 is a cross-sectional view taken along line II-II' of FIG. 1.

FIG. 1 is a perspective view schematically illustrating a multilayer capacitor applied to an electronic according to an exemplary embodiment, FIG. 2 is a transparent perspective view of FIG. 1, and FIG. 3 is an exploded perspective view illustrating a coupling structure of first and second internal electrodes and first and second external electrodes in FIG. 2. FIG. 4 is a cross-sectional view taken along line I-I' of FIG. 1, and FIG. 5 is a cross-sectional view taken along line II-II' of FIG. 1.

Referring to FIGS. 1 to 5, a multilayer capacitor 100 according to an exemplary embodiment includes a capacitor body 110 and first and second external electrodes 131 and 132.

The capacitor body 110 includes a plurality of dielectric layers stacked in the Y direction, and first and second internal electrodes 121 and 122 alternately disposed in the Y direction with the dielectric layers interposed therebetween.

The capacitor body 110 may have an approximately hexahedral shape and may include first and second surfaces 1 and 2 opposing each other in the Z direction, and third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4 and opposing each other in the Y direction.

Dielectric layers 111 are in a sintered state, and adjacent dielectric layers 111 may be integrated to such an extent that the boundary therebetween may be difficult to identify without using a scanning electron microscope (SEM).

The dielectric layer 111 may include ceramic powder having a high dielectric constant, for example, barium titanate ($BaTiO_3$)-based or strontium titanate ($SrTiO_3$)-based powder, magnesium titanate, or the like.

In addition to the ceramic powder, at least one or more ceramic additives, organic solvents, plasticizers, binders and dispersants may be added to the dielectric layer 111, as required.

The capacitor body 110 may have a cover region disposed on both sides of the Y direction as a margin.

The cover region may have the same material and configuration as the dielectric layer 111 except that the cover region does not include an internal electrode.

The cover region may be formed by stacking a single dielectric layer or two or more dielectric layers on both outermost sides of the capacitor body 110 in the Y direction, respectively, and may basically serve to prevent damage to the first and second internal electrodes 121 and 122 from physical or chemical stresses.

The first internal electrode 121 may include a first capacitance portion 121a and a first lead portion 121b.

The first capacitance portion 121a is a part contributing to the capacitance formation of the multilayer capacitor 100 and may be spaced apart from the edge of the capacitor body 110.

The first lead portion 121b is a portion extending from the first capacitance portion 121a to be exposed through the first surface 1 of the capacitor body 110 and is connected to the first external electrode 131.

The second internal electrode 122 may include a second capacitance portion 122a and a second lead portion 122b.

The second capacitance portion 122a is a portion contributing to the capacitance formation of the multilayer capacitor 100 and is spaced apart from the edge of the capacitor body 110 and overlaps the first capacitance portion 121a in the Y direction.

The second lead portion 122b is a portion extending from the second capacitance portion 122a to be exposed through the first surface 1 of the capacitor body 110 and is connected to the second external electrode 132.

The first and second internal electrodes 121 and 122 are electrodes to which voltages having different polarities are applied.

In this case, the first and second internal electrodes 121 and 122 may be electrically insulated from each other by the dielectric layer 111 disposed therebetween.

The material forming the first and second internal electrodes 121 and 122 is not particularly limited, and for example, may be formed using a conductive paste formed of one or more of precious metal materials such as palladium (Pd) and palladium-silver (Pd—Ag) alloys, and nickel (Ni) and copper (Cu).

In this case, the printing method of the conductive paste may be screen printing or gravure printing, etc., and an embodiment thereof is not limited thereto.

The first external electrode 131 is disposed on the first surface 1 of the capacitor body 110 and is connected to the first lead portion 121b.

The first external electrode 131 may include a first connection portion 131a and a pair of first band portions 131b.

The first connection portion 131a is a portion formed on the first surface 1 of the capacitor body 110 and connected to the first lead portion 121b.

The pair of first band portions 131b are portions extending from the both ends of the first connection portion 131a in the Y direction to portions of the fifth and sixth surfaces 5 and 6 of the capacitor body 110, respectively, and thus, the adhesion strength of the external electrode 131 may be improved.

The second external electrode 132 is disposed on the first surface 1 of the capacitor body 110 to be spaced apart from the first external electrode 131 in the X direction, and is connected to the second lead portion 122b.

The second external electrode 132 may include a second connection portion 132a and a pair of second band portions 132b.

The second connection portion 132a is a portion formed on the first surface 1 of the capacitor body 110 to be spaced apart from the first connection portion 131a in the X direction, and is connected to the second lead portion 122b.

The pair of second band portions 132b are portions extending from both ends of the second connection portion 132a in the Y direction to portions of the fifth and sixth surfaces 5 and 6 of the capacitor body 110, respectively, and thus, the adhesion strength of the external electrode 132 may be improved.

In this embodiment, the first and second external electrodes 131 and 132 are formed only on the first surface 1 of the capacitor body 110.

Therefore, the overall mounting area is relatively reduced compared to a structure in which external electrodes are formed on both ends of a capacitor body, thereby improving the mounting density of the substrate.

In addition, plating layers may be further formed on surfaces of the first and second external electrodes 131 and 132, respectively.

The plating layer may include a nickel plating layer covering the first and second external electrodes and a tin plating layer covering the nickel plating layer.

In related art multilayer capacitor, since external electrodes are disposed on both ends of a capacitor body opposing each other in the X direction, a relatively large current loop is formed because the path of the current is long when alternating current (AC) is applied to the external electrode, which increases the magnitude of the induced magnetic field. Therefore, inductance of the electronic component may increase.

In this embodiment, the first external electrode 131 and the second external electrode 132 are disposed on the first surface 1 of the capacitor body 110 to shorten the path of the current, thereby reducing the current loop and thus reducing inductance of the multilayer capacitor 100.

Figure 6:
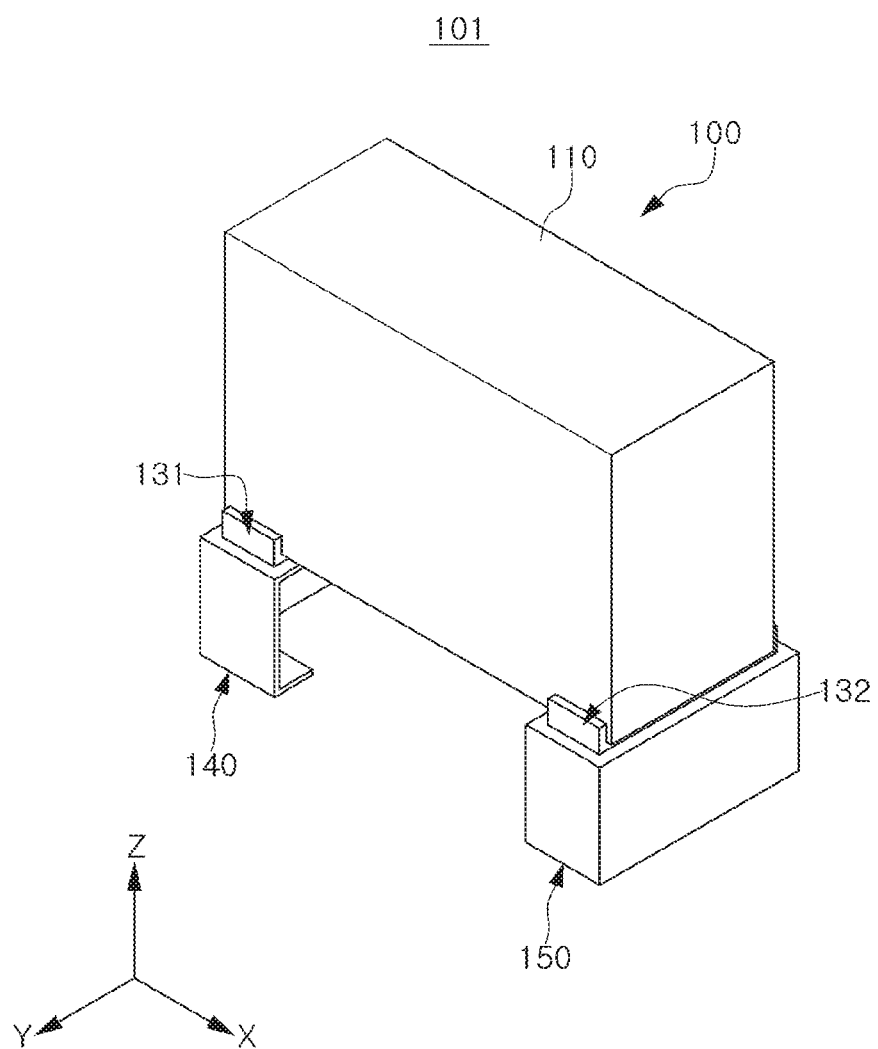
FIG. 6 is a perspective view schematically illustrating an electronic component according to an exemplary embodiment.
Figure 7:
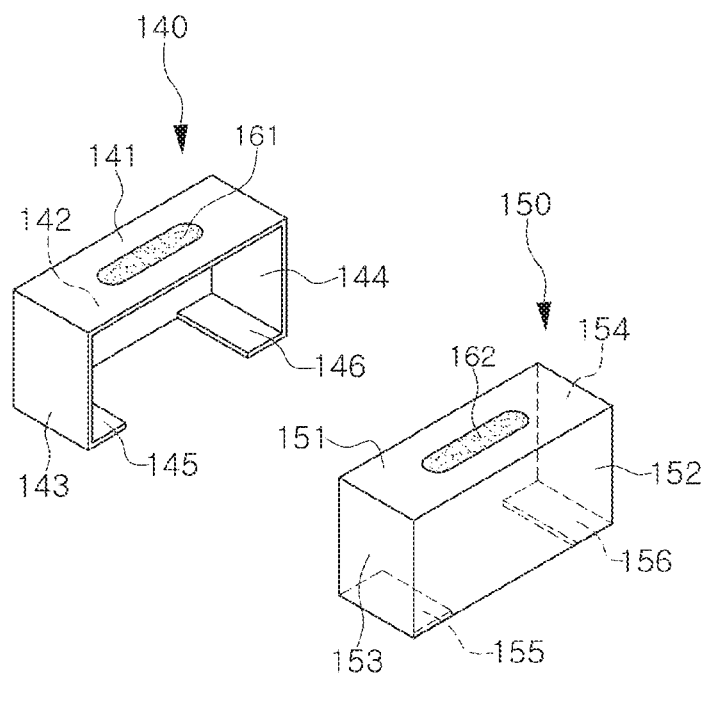
FIG. 7 is an exploded perspective view illustrating first and second metal frames of FIG. 6.
Figure 7:
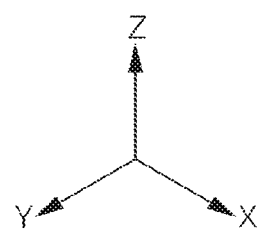

FIG. 6 is a perspective view schematically illustrating an electronic component according to an exemplary embodiment, and FIG. 7 is an exploded perspective view illustrating first and second metal frames of FIG. 6.

Referring to FIGS. 6 and 7, an electronic component according to an exemplary embodiment includes the multilayer capacitor 100 described above and first and second metal frames 140 and 150.

In this case, the detailed description thereof will be omitted to avoid duplication, and a part having a different structure from the aforementioned embodiment will be described in detail.

The first metal frame 140 is connected to a first external electrode 131.

The first metal frame 140 may include a first bonding portion 141, a pair of first vertical portions 143 and 144, and a pair of first mounting portions 145 and 146.

The first bonding portion 141 is a portion bonded to the first external electrode 131.

The pair of first vertical portions 143 and 144 extend in the Z direction, from both ends of the first bonding portion 141 in the Y direction, respectively, to separate the multilayer capacitor 100 from a mounting substrate.

The pair of first mounting portions 145 and 146 may extend from one ends of the pair of first vertical portions 143 and 144 to face each other in the Y direction, may serve as terminals when performing the mounting on the board, and may be bonded to the solder or the like with the land pattern of the substrate to be electrically connected to each other.

The second metal frame 150 is connected to the second external electrode 132.

The second metal frame 150 may include a second bonding portion 151, a pair of second vertical portions 153 and 154, and a pair of second mounting portions 155 and 156.

The second bonding portion 151 is a part bonded to the second external electrode 132.

The pair of second vertical portions 153 and 154 extend in the Z direction from both ends of the second bonding portion 151 in the Y direction respectively to serve to separate the multilayer capacitor 100 from the mounting substrate.

The pair of second mounting portions 155 and 156 may extend from one ends of the pair of second vertical portions 153 and 154 to face each other in the Y direction to serve as terminals when performing the mounting on the board, and may be bonded to solder with the land pattern of the substrate to be electrically connected to each other.

In this case, a first conductive bonding layer 161 is formed between the first bonding portion 141 and the first connection portion 131*a* of the first external electrode 131, and a second conductive bonding portion 162 is formed between the second bonding portion 151 and the second connection portion 132*a* of the second external electrode 132.

The first and second conductive bonding layers 161 and 162 may be formed of high melting point solder, but an embodiment thereof is not limited thereto.

The first metal frame 140 may further include a first connecting portion 142 connecting the pair of first vertical portions 143 and 144 in the Y direction.

In this case, the first connecting portion 142 may be located outwardly of the third surface 3 of the capacitor body 110 in the X direction.

The second metal frame 150 may further include a second connecting portion 152 connecting the pair of second vertical portions 153 and 154 in the Y direction.

In this case, the second connecting portion 152 may be located outwardly of the fourth surface 4 of the capacitor body 110 in the X direction.

According to the configuration as described above, the first metal frame 140 may be configured to have a hexahedral shape in which one surface in the X direction is spaced apart from and the pair of the first mounting portions 145 and 146, and the second metal frame 150 may be configured to have a hexahedral shape in which one surface in the X direction is spaced apart from the pair of second mounting portions 155 and 156.

In the case of related art multilayer capacitor, a capacitor body and a substrate are directly contacted by solder when performing the mounting on the substrate, and heat or mechanical deformation generated from the substrate is transferred directly to the multilayer capacitor, and thus, ensuring a high level of reliability may be difficult.

Recently, a method has been proposed in which a metal frame is bonded to a side of a multilayer capacitor to secure a gap between the multilayer capacitor and the substrate so that stress from the substrate is not directly transmitted to the multilayer capacitor.

However, in a case in which a gap is generated between the multilayer capacitor and the substrate due to the bonding of the metal frame, there may be a problem in which ESR is increased, compared to the structure in which the multilayer capacitor is in direct contact with the substrate.

Meanwhile, according to this embodiment of the present disclosure, the first and second metal frames 140 and 150 are installed to increase durability against vibrations and deformation, thereby improving reliability of the electronic component.

In addition, since the first and second metal frames 140 and 150 are disposed on the first surface 1 of the capacitor body 110 to form a relatively short gap between the external electrodes 131 and 132, ESR may be reduced even in the case of the structure including the metal frame.

In addition, in this embodiment, since the internal electrode is formed in the Z direction like the vertical portion of the metal frame, vibration absorption may be easily performed.

Figure 8:
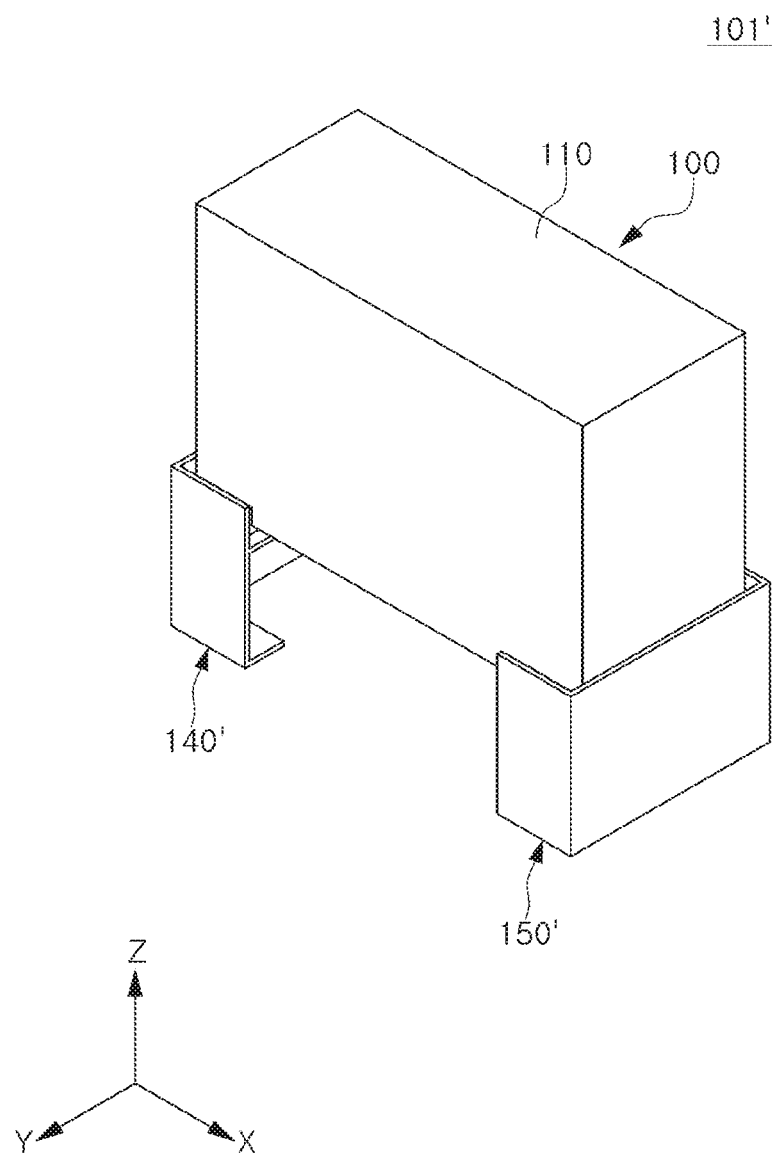
FIG. 8 is a schematic perspective view of an electronic component according to another exemplary embodiment.
Figure 9:
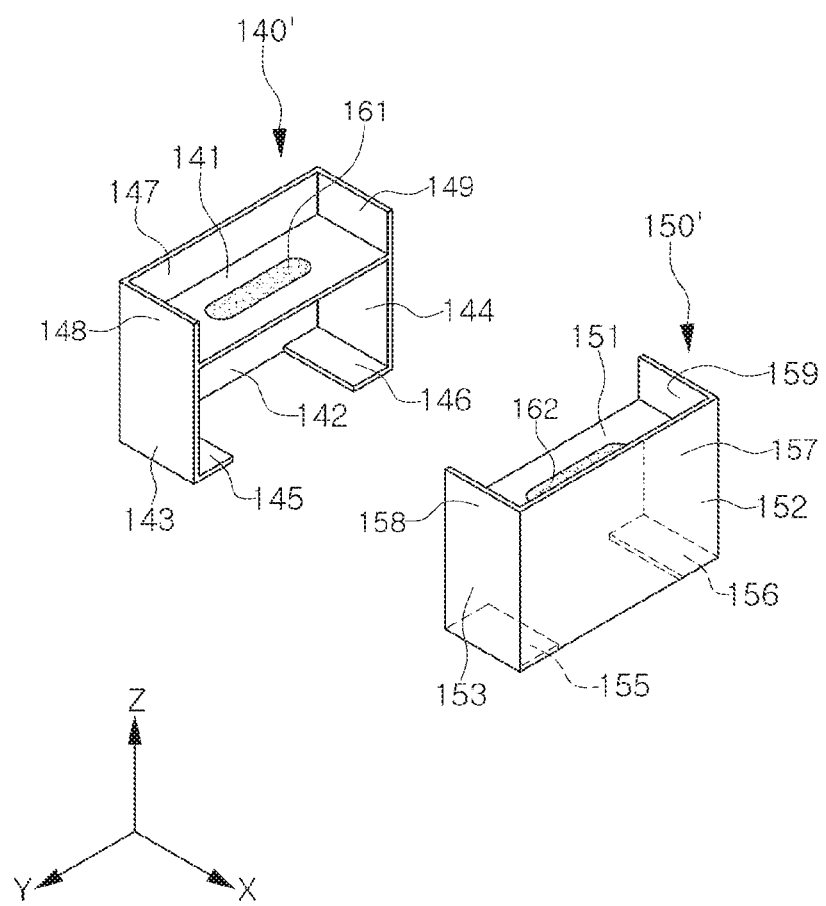
FIG. 9 is an exploded perspective view illustrating first and second metal frames of FIG. 8.

FIG. 8 is a perspective view schematically illustrating an electronic component according to another exemplary embodiment of the present disclosure, and FIG. 9 is an exploded perspective view illustrating first and second metal frames of FIG. 8.

In this case, the detailed description thereof will be omitted to avoid duplication, and a part having a different structure from the aforementioned embodiment will be described in detail.

Referring to FIGS. 8 and 9, in an electronic component 101' according to an exemplary embodiment, a first metal frame 140' may further include a first guide portion 147 extending to a portion of the third surface 3 of the capacitor body 110 from the first connecting portion 142.

A second metal frame 150' may further include a second guide portion 157 extending from the second connecting portion 152 to a portion of the fourth surface 4 of the capacitor body 100.

In addition, the first metal frame 140' may further include a pair of first extension portions 148 and 149 extending from the pair of first vertical portions 143 and 144 to portions of the fifth and sixth surfaces 5 and 6 of the capacitor body 110, respectively.

In this case, the pair of first extension portions 148 and 149 may be bonded to the pair of first band portions 131b, respectively.

The second metal frame 150' may further include a pair of second extension portions 158 and 159 extending from the pair of second vertical portions 153 and 154 to portions of the fifth and sixth surfaces 5 and 6 of the capacitor body 110, respectively.

In this case, the pair of second extension portions 158 and 159 may be bonded to the pair of second band portions 132b, respectively.

As set forth above, according to various exemplary embodiments of the present disclosure, a structure having a metal frame is provided, and ESR may be reduced, while improving reliability, by increasing durability against vibrations and deformation.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic component comprising:
a capacitor body having first and second surfaces opposing each other, third and fourth surfaces connected to the first and second surfaces and opposing each other, and fifth and sixth surfaces connected to the first, second, third and fourth surfaces and opposing each other in a first direction, the capacitor body including a plurality of dielectric layers stacked in the first direction and first and second internal electrodes alternately stacked with a respective dielectric layer interposed therebetween;

first and second external electrodes disposed on the first surface of the capacitor body and spaced apart from each other in a second direction connecting the third and fourth surfaces; and first and second metal frames connected to the first and second external electrodes, respectively, wherein the first internal electrode includes a first lead portion exposed through the first surface of the capacitor body and connected to the first external electrode, the second internal electrode includes a second lead portion exposed through the first surface of the capacitor body and connected to the second external electrode, the first metal frame comprises a first bonding portion coupled to the first external electrode, a pair of first vertical portions extending in a third direction connecting the first and second surfaces of the capacitor body, from opposing end edges of the first bonding portion in the first direction, respectively, and a pair of first mounting portions extending from one ends of the pair of first vertical portions, respectively, the second metal frame comprises a second bonding portion coupled to the second external electrode, a pair of second vertical portions extending in the third direction from opposing end edges of the second bonding portion in the first direction, respectively, and a pair of second mounting portions extending from one ends of the pair of second vertical portions, respectively, the first bonding portion is located between the first external electrode and the pair of first mounting portions in the third direction, and the second bonding portion is located between the second external electrode and the pair of second mounting portions in the third direction.

2. The electronic component of claim 1, wherein the pair of first mounting portions extend from the one ends of the pair of first vertical portions, respectively, to face each other in the first direction, and the pair of second mounting portions extend from the one ends of the pair of second vertical portions, respectively, to face each other in the first direction.

3. The electronic component of claim 2, wherein the first metal frame further comprises a first connecting portion connecting the pair of first vertical portions in the first direction, and the second metal frame further comprises a second connecting portion connecting the pair of second vertical portions in the first direction.

4. The electronic component of claim 3, wherein the first connecting portion is located outwardly of the third surface of the capacitor body in the second direction, and the second connecting portion is located outwardly of the fourth surface of the capacitor body in the second direction.

5. The electronic component of claim 3, wherein the first metal frame has a hexahedral shape in which an inner surface of the first metal frame is opened in the second direction and the pair of first mounting portions are spaced apart from each other in the first direction, and the second metal frame has a hexahedral shape in which an inner surface of the second metal frame is opened in the second direction and the pair of second mounting portions are spaced apart from each other in the first direction.

6. The electronic component of claim 3, wherein the first metal frame further comprises a first guide portion extending in the third direction from the first connecting portion along a portion of the third surface of the capacitor body, and the second metal frame further comprises a second guide portion extending in the third direction from the second connecting portion along a portion of the fourth surface of the capacitor body.

7. The electronic component of claim 2, wherein the first and second external electrodes comprise first and second connection portions respectively disposed on first surface of the capacitor body, and a pair of first and second band portions extending in the third direction from the first and second connection portions along portions of the fifth and sixth surfaces of the capacitor body, respectively.

8. The electronic component of claim 7, wherein the first metal frame further comprises a pair of first extension portions extending from the pair of first vertical portions to be connected to the pair of first band portions, respectively, and the second metal frame further comprises a pair of second extension portions extending from the pair of second vertical portions to be connected to the pair of second band portions, respectively.

9. The electronic component of claim 2, further comprising:

a first conductive bonding layer arranged between the first bonding portion and the first external electrode; and a second conductive bonding layer arranged between the second bonding portion and the second external electrode.

10. The electronic component of claim 9, wherein the first and second conductive bonding layers include a solder having a relatively high melting point.

11. An electronic component comprising:

a capacitor body having first and second surfaces opposing each other, third and fourth surfaces connected to the first and second surfaces and opposing each other, and fifth and sixth surfaces connected to the first, second, third and fourth surfaces and opposing each other in a first direction, the capacitor body including a plurality of dielectric layers stacked in the first direction and first and second internal electrodes alternately stacked with a respective dielectric layer interposed therebetween;

first and second external electrodes disposed on the first surface of the capacitor body and respectively connected to the first and second internal electrodes exposed through the first surface of the capacitor body, the first and second external electrodes being spaced apart from each other in a second direction connecting the third and fourth surfaces; and first and second metal frames contacting the first and second external electrodes, respectively, and extending in a third direction connecting the first and second surfaces of the capacitor body to be mounted on a mounting substrate, wherein the first metal frame comprises a first bonding portion coupled to the first external electrode, a pair of first vertical portions extending in the third direction from opposing end edges of the first bonding portion in the first direction, respectively, and a pair of first mounting portions extending from one ends of the pair of first vertical portions, respectively, the second metal frame comprises a second bonding portion coupled to the second external electrode, a pair of second vertical portions extending in the third direction from opposing end edges of the second bonding portion in the first direction, respectively, and a pair of second mounting portions extending from one ends of the pair of second vertical portions, respectively, the first bonding portion is located between the first external electrode and the pair of first mounting portions in the third direction, and the second bonding portion is located between the second external electrode and the pair of second mounting portions in the third direction.

12. The electronic component of claim 11, wherein the pair of first mounting portions extend from the one ends of the pair of first vertical portions, respectively, to face each other in the first direction, and the pair of second mounting portions extend from the one ends of the pair of second vertical portions, respectively, to face each other in the first direction.

13. The electronic component of claim 12, wherein the first metal frame further comprises a first connecting portion connecting the pair of first vertical portions in the first direction, and the second metal frame further comprises a second connecting portion connecting the pair of second vertical portions in the first direction.

14. The electronic component of claim 13, wherein the first connecting portion is located outwardly of the third surface of the capacitor body in the second direction, and the second connecting portion is located outwardly of the fourth surface of the capacitor body in the second direction.

15. The electronic component of claim 13, wherein the first metal frame has a hexahedral shape in which one surface of the first metal frame in the second direction is spaced apart from the pair of first mounting portions, and the second metal frame has a hexahedral shape in which one surface of the second metal frame in the second direction is spaced apart from the pair of second mounting portions.

16. The electronic component of claim 13, wherein the first metal frame further comprises a first guide portion extending in the third direction from the first connecting portion along a portion of the third surface of the capacitor body, and the second metal frame further comprises a second guide portion extending in the third direction from the second connecting portion along a portion of the fourth surface of the capacitor body.

17. An electronic component comprising:

a capacitor body including a plurality of dielectric layers and first and second internal electrodes alternately stacked with a respective dielectric layer interposed therebetween in a first direction;

first and second external electrodes disposed on a first surface of the capacitor body, spaced apart from each other in a second direction perpendicular to the first direction, and electrically connected to the first and second internal electrodes, respectively; and first and second metal frames connected to the first and second external electrodes, respectively, wherein the first metal frame comprises a first bonding portion coupled to the first external electrode, a pair of first vertical portions extending in a third direction perpendicular to the first and second directions, from both ends of the first bonding portion, respectively, and a pair of first mounting portions protruding in the first direction from one ends of the pair of first vertical portions, respectively, to face each other in the first direction, the second metal frame comprises a second bonding portion coupled to the second external electrode, a pair of second vertical portions extending in the third direction from both ends of the second bonding portion, respectively, and a pair of second mounting portions protruding in the first direction from one ends of the pair of second vertical portions, respectively, to face each other in the first direction, the plurality of dielectric layers are stacked in the first direction, the first internal electrode includes a first lead portion exposed through the first surface of the capacitor body and connected to the first external electrode in the third direction, and the second internal electrode includes a second lead portion exposed through the first surface of the capacitor body and connected to the second external electrode in the third direction.

18. The electronic component of claim 17, wherein the capacitor body has the first surface and a second surface opposing each other in the third direction, third and fourth surfaces connected to the first and second surfaces and opposing each other in the second direction, and fifth and sixth surfaces connected to the first, second, third and fourth surfaces and opposing each other in the first direction.

19. The electronic component of claim 18, wherein the pair of first vertical portions are located outwardly of the fifth and sixth surfaces of the capacitor body in the first direction, and the pair of second vertical portions are located outwardly of the fifth and sixth surfaces of the capacitor body in the first direction.

20. The electronic component of claim 17, wherein the pair of first vertical portions extend in respective planes facing each other in the first direction, and the pair of second vertical portions extend in respective planes facing each other in the first direction.

* * * * *